No. 872,009. PATENTED NOV. 26, 1907.
C. PEARSON.
HAY RAKE.
APPLICATION FILED JULY 15, 1907.
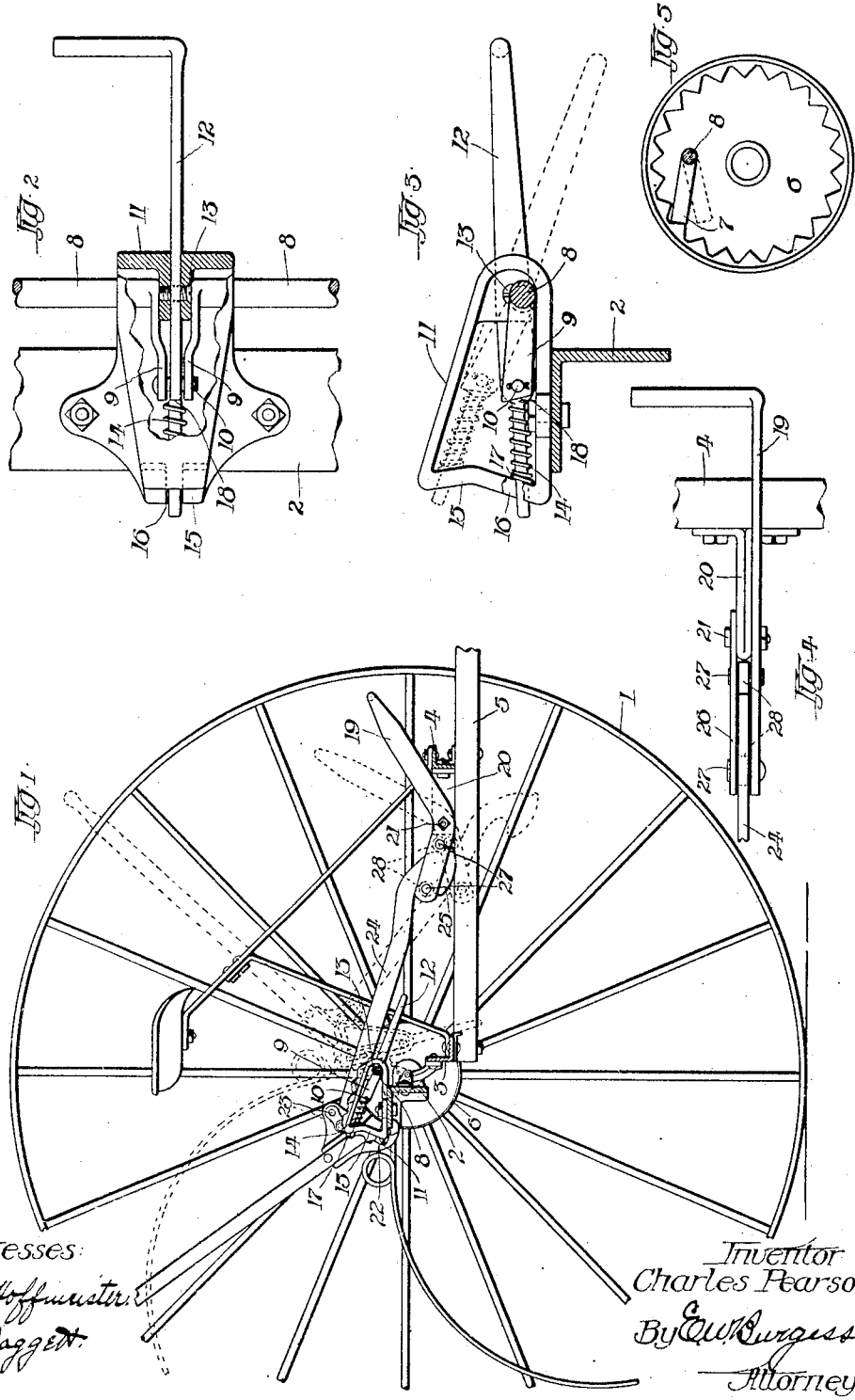
Witnesses
F. W. Hoffmeister
J. N. Daggett
Inventor
Charles Pearson
By E. W. Burgess
Attorney

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

HAY-RAKE.

No. 872,009.     Specification of Letters Patent.     Patented Nov. 26, 1907.

Application filed July 15, 1907. Serial No. 383,903.

*To all whom it may concern:*

Be it known that I, CHARLES PEARSON, a citizen of the United States, residing at Chicago, in the county of Cook and State of Illinois, have invented certain new and useful Improvements in Hay-Rakes, of which the following is a specification.

My invention relates to hay rakes in general, and specifically to such as are commonly termed draft dump-rakes, and it has for its object the providing of improved mechanism for tripping the dumping mechanism into operation, and also means for locking the rake in raking position. These objects are attained by the mechanism illustrated by the accompanying drawing, in which—

Figure 1 represents a side elevation of a part of a rake embodying my invention. Fig. 2 is a detached plan view detail, partly in section, of the tripping mechanism. Fig. 3 is an end elevation of Fig. 2. Fig. 4 is a plan view of a portion of the locking mechanism; and Fig. 5 is a detail showing one of the toothed dumping wheels and its associated pawl.

The same reference numerals designate like parts throughout the several views.

1 represents the carrying wheels, 2 the rocking rake head suitably mounted thereon, 3 a rear member of the draft frame, and 4 a forward member thereof, the rear member being pivotally connected with the head, and 5 represents the thills secured to the draft frame.

6 represents a common form of internally toothed wheel usually integral with the hubs of the carrying wheels, and 7 is a pawl adapted to engage with the teeth of the wheel in a manner to cause the rake head to rock in a well-known way as the carrying wheels revolve. 8 represents a rock-shaft, preferably formed in two parts, having a pawl 7 at each of its outer ends, and its inner adjacent ends provided with rearwardly extending arms 9 that are connected by a pin 10.

The shaft is provided with suitable bearings secured to the head adjacent to the toothed wheels at opposite ends thereof, and the pawls are arranged within the toothed wheels as shown in Fig. 5; the inner adjacent ends of the shaft being supported in bearings formed in a bracket 11 secured to the head near its middle portion. A foot lever 12 is pivotally mounted in the bracket by means of a pin 13, and in rear of its pivotal axis is connected with the rock-shaft by means of the pin 10 passing through an opening in the lever. The rear end of the lever is provided with a reduced portion beyond the axis of the pin 10, and surrounding such reduced portion is a coiled spring 14. The bracket 11 is provided with a vertically disposed member 15, having a guide slot 16 throughout its length that receives the rear end of the lever 12. The side walls of the slotted member incline forward and upward throughout a portion of their length, and then rearward and upward, and a washer 17 is interposed between the spring 14 and the inner face of the inclined wall and the spring operating between a shoulder 18 on the lever, and said washer frictionally resists a movement of said lever about its axis, and the inclines on the wall direct the force of the spring in a manner to yieldingly hold the lever at either its upper or lower limit of movement.

Pressure upon the forward end of the lever rocks the shaft 8 in its bearings and causes the pawls to engage with the toothed wheels, and the frictional resistance of the spring, operating through the washer 17 and the wall of the bracket, will retain the shaft in its tripped position if for any reason the pressure be removed; and at the end of the dumping operation of the rake the forward end of the lever contacts with the member 3 of the draft frame in a manner to rock said shaft in an opposite direction to release the pawls and the lower inclined portion of the bracket wall retains the shaft yieldingly in its released position.

To lock the rake in raking position there is provided a foot lever 19, pivotally mounted upon the draft frame by means of a bracket 20 and pin 21, and it projects forward and in rear of the axis of the pin. A bracket 22 is secured to the rake head and provided with a series of lateral openings 23 therethrough, by means of which the rear end of a link 24 is pivotally connected with the bracket, the forward end of the link being curved downward and terminating in a T head portion 25.

The foot lever 19 is connected at its rear end to a supplemental bar 26 by means of the pin 21, and these parts are also connected by means of pins 27 having rollers 28 mounted thereon, the pins being arranged in a manner to provide for the reception of the body portion of the forward end of the link 24 in a slidable manner between the rollers; and the T head upon the end of the link operates to limit a sliding movement of the link in one direction, and the curved portion, when pressure is applied to the foot lever to retain it in its forward position, prevents a like movement of the link in an opposite direction; the link being free to slide between the rollers when pressure is removed from the lever and the dumping mechanism tripped into operation.

What I claim as being my invention, and desire to secure by Letters Patent, is:

1. A dumping mechanism for hay rakes having, in combination, carrying wheels, a draft frame, a rocking head, toothed wheels rotatable with said carrying wheels, a rock-shaft mounted upon said head and having pawls at opposite ends thereof, said pawls being adapted to engage with said toothed wheels when said shaft is rocked in one direction, means for rocking said shaft, said means comprising a lever connected intermediate its ends to said shaft, and extending forward and in rear of the axis thereof, a bracket secured to said head and having a vertically disposed member, and a friction member mounted upon the rear end of said lever and held in yielding contact with said vertical member.

2. A dumping mechanism for hay rakes having, in combination, carrying wheels, a draft frame, a rocking head, toothed wheels rotatable with said carrying wheels, a rock-shaft mounted upon said head and having pawls at opposite ends thereof, said pawls being adapted to engage with said toothed wheels when said shaft is rocked in one direction, means for rocking said shaft, said means comprising a lever connected intermediate its ends to said shaft, and extending forward and in rear of the axis thereof, a bracket secured to said head and having a vertically disposed member, said vertical member having a slot therein, which slot receives the rear end of said lever, a coiled spring surrounding said lever and operative against the adjacent face of said vertical member to frictionally oppose a movement of the lever.

3. A dumping mechanism for hay rakes having, in combination, carrying wheels, a draft frame, a rocking head, toothed wheels rotatable with said carrying wheels, a rock-shaft mounted upon said head and having pawls at opposite ends thereof, said pawls being adapted to engage with said toothed wheels when said shaft is rocked in one direction, means for rocking said shaft, said means comprising a lever connected intermediate its ends to said shaft, and extending forward and in rear of the axis thereof, a bracket secured to said head and having a vertically disposed member, said member having a slot therein, which slot receives the rear end of said lever, a coiled spring surrounding said lever and operative against the adjacent inner wall of said vertical member to frictionally oppose a movement of said lever, the said inner wall of said vertical member having inclined surfaces in the direction of its length, against which said spring is frictionally operative.

4. A dumping mechanism for hay rakes having, in combination, carrying wheels, a draft frame, a rocking head, toothed wheels rotatable with said carrying wheels, a rock-shaft mounted upon said head and having pawls at opposite ends thereof adapted to engage with said toothed wheels, a bracket secured to said head intermediate its ends, said rock-shaft journaled in said bracket, a foot lever pivotally connected with the forward portion of said bracket, and extending forward and in rear of the pivotal axis, said rock-shaft having arms extending rearward, said arms being pivotally connected with said foot lever, a vertically disposed wall forming the rear portion of said bracket, said wall having a vertically arranged slot receiving the rear end of said foot lever, a coiled spring surrounding said lever and operative against the inner face of said wall in a manner to frictionally oppose a movement of said lever, the wall being inclined inward and upward and then rearward and upward from the axis of said rock-shaft.

5. In a hay rake and in combination, carrying wheels, a draft frame, a rocking head pivotally connected with said draft frame, a locking mechanism comprising a foot lever pivotally mounted intermediate its ends upon said draft frame, and extending forward and in rear of its pivotal axis, a bracket secured to said head, a link having its rear end pivotally connected with said bracket, the forward end of said link being provided with a hook-shaped end, laterally projecting guide pins secured to the rear end of said foot lever and having the hooked end of said link slidably received between said pins.

6. In a hay rake and in combination, carrying wheels, a draft frame, a rocking head pivotally connected with said draft frame, a locking mechanism comprising a foot lever pivotally mounted intermediate its ends upon said draft frame, and extending forward and in rear of its pivotal axis, a bracket secured to said head, a link having its rear end pivotally connected with said bracket, the forward end of said link being formed with a downwardly curved portion terminating in a T shaped head, laterally projecting guide rollers secured to the rear end of said foot lever and having the forward end of said link slidably received between said rollers.

CHARLES PEARSON.

Witnesses:
RAY PATTISON,
WILLIAM WEBBER.